US008930338B2

(12) United States Patent
Velipasaoglu et al.

(10) Patent No.: US 8,930,338 B2
(45) Date of Patent: Jan. 6, 2015

(54) SYSTEM AND METHOD FOR CONTEXTUALIZING QUERY INSTRUCTIONS USING USER'S RECENT SEARCH HISTORY

(75) Inventors: Omer Emre Velipasaoglu, San Francisco, CA (US); Umut Ozertem, Sunnyvale, CA (US); Alpa Jain, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 260 days.

(21) Appl. No.: 13/109,274

(22) Filed: May 17, 2011

(65) Prior Publication Data

US 2012/0296927 A1    Nov. 22, 2012

(51) Int. Cl.
*G06F 17/30*    (2006.01)

(52) U.S. Cl.
CPC ................................. *G06F 17/30* (2013.01)
USPC ........... 707/706; 707/722; 707/758; 707/781; 707/822; 707/828

(58) Field of Classification Search
CPC ....................................................... G06F 17/30
USPC ................................................. 707/600–899
See application file for complete search history.

(56) References Cited

U.S. PATENT DOCUMENTS

| | | | | |
|---|---|---|---|---|
| 6,006,225 | A * | 12/1999 | Bowman et al. | 707/999.002 |
| 7,051,023 | B2 * | 5/2006 | Kapur et al. | 707/690 |
| 7,647,312 | B2 * | 1/2010 | Dai | 707/999.004 |
| 7,984,004 | B2 * | 7/2011 | Andrew et al. | 706/45 |
| 8,392,435 | B1 * | 3/2013 | Yamauchi | 707/749 |
| 2007/0050339 | A1 * | 3/2007 | Kasperski et al. | 707/3 |
| 2009/0282038 | A1 * | 11/2009 | Subotin et al. | 707/999.006 |
| 2010/0057675 | A1 * | 3/2010 | White et al. | 707/3 |
| 2010/0082649 | A1 * | 4/2010 | Gutt et al. | 707/758 |
| 2010/0223252 | A1 * | 9/2010 | Broman et al. | 707/709 |
| 2011/0184951 | A1 * | 7/2011 | Paparizos et al. | 707/737 |
| 2012/0130978 | A1 * | 5/2012 | Li et al. | 707/706 |

OTHER PUBLICATIONS

Hoa Ma et al., Learning Latent semantic relations from clickthrough data for query suggestion, 2008, ACM conference on Information and Knowledge, pp. 709-718.*
Chien-Kang Huang et al., Relevant term suggestion in interactive web search based on contextual information in query session logs, journal of the American Society for Information Science and Technology,May 2003, vol. 54, Issue 7, pp. 638-649.*
Google, About Google Instant; http://www.google.com/instant/ (c) 2001 Google Retrieved Feb. 24, 2011.

(Continued)

*Primary Examiner* — Isaac M Woo
(74) *Attorney, Agent, or Firm* — James J. DeCarlo; Greenberg Traurig, LLP

(57) ABSTRACT

Disclosed is a system and method for providing search suggestions to a user based on the user's previously entered search queries. A computing device stores a global set of search suggestions. The computing device receives over a network from a user computer operated by a user one or more alphanumeric characters forming a portion of a search query. The computing device determines a search suggestion to the portion of the search query from the global set of search suggestions based on a search history of the user, the search history of the user comprising a plurality of search queries entered by the user within a predetermined period of time. The computing device transmits to the user computer the search suggestion for display by the user computer.

17 Claims, 3 Drawing Sheets

(56) References Cited

OTHER PUBLICATIONS

U.S. Appl. No. 12/882,974 entitled "Search Assist Powered by Session Analysis".
Almeida et al., "A Community-Aware Search Engine", WWW2004, May 17-22, 2004; pp. 413-421.
Anick, "Using Terminological Feedback for Web Search Refinement—A Log-based Study", SIGIR'03, Jul. 28-Aug. 1, 2003; pp. 88-95.
Baeza-Yates et al., "Query Recommendation Using Query Logs in Search Engines", 2005; 10 pgs.
Conti et al., "Countering Security Information Overload Through Alert and Packet", IEEE Computer Graphics and Applications, Mar./Apr. 2006; pp. 30-40.
Craswell et al., "Random Walks on the Click Graph", SIGIR'07, Jul. 23-27, 2007; 8 pgs.
Dang et al., "Query Reformulation Using Anchor Text", WSDM'10, Feb. 4-6, 2010; 10 pgs.
Dou et al., "A Large-scale Evaluation and Analysis of Personalized Search Strategies", WWW 2007, May 8-12, 2007; pp. 581-590.
Fonseca et al., "Using associated rules to discover search engines related queries", Proceedings of the First Latin American Web Congress (LA-WEB 2003), IEEE Computer Society; 6 pgs.
Fuxman et al., "Using the Wisdom of the Crowds for Keyword Generation", WWW 2008 / Refereed Track: Data Mining—Log Analysis, Apr. 21-25, 2008; pp. 61-70.
Huang et al., "Exploring Web Scale Language Models for Search Query Processing", WWW 2010, Apr. 26-30, 2010; 10 pgs.
Jones et al., "Generating Query Substitutions", WWW 2006, May 23-26, 2006; 10 pgs.
Jones et al., "Query Word Deletion Prediction", SIGIR '03, Jul. 28-Aug. 1, 2003; 2 pgs.
Mei et al., "Query Suggestion Using Hitting Time", CIKM '08, Oct. 26-30, 2008; 9 pgs.
Mihalkova et al., "Search Query Disambigation from Short Sessions", 2009; 2 pgs.
Ruthven, "Re-examining the Potential Effectiveness of Interactive Query Expansion", SIGIR '03, Jul. 28-Aug. 1, 2003; 8 pgs.
Schutze, "Automatic Word Sense Discrimination", Computer Linguistics, vol. 24, No. 1; pp. 97-123 Copyright (c) 1998 Association for Computational Linguistics.
Sugiyama et al., "Adaptive Web Search Based on User Profile Constructed without Any Effort from Users", WWW 2004, May 17-22, 2004; pp. 675-684.
Sun et al., "CubeSVD: A Novel Approach to Personalized Web Search", WWW 2005, May 10-14, 2005; pp. 382-390.
Szpektor et al., "Improving Recommendation for Long-tail Queries via Templates", WWW 2011, Mar. 28-Apr. 1, 2011; pp. 47-56.
Tan et al., "Unsupervised Query Segmentation Using Generative Language Models and Wikipedia", WWW 2008 / Refereed Track: Search—Query Analysis, Apr. 21-25, 2008; 10 pgs.
Terra et al., "Scoring Missing Terms in Information Retrieval Tasks", CIKM '04, Nov. 8-13, 2004; 9 pgs.
Wen et al., "Clustering User Queries of a Search Engine", WWW '10, May 1-5, 2001; pp. 162-168.
Zhang et al., "Mining Search Engine Query Logs for Query Recommendation", WWW 2006, May 22-26, 2006; 2 pgs.

\* cited by examiner

SYSTEM AND METHOD FOR CONTEXTUALIZING QUERY INSTRUCTIONS USING USER'S RECENT SEARCH HISTORY

FIELD

The present disclosure relates to searching on the web, and more specifically to displaying search suggestions in response to receiving a portion of a search query.

BACKGROUND

Search assistance modules in typical commercial search engines can be categorized into presubmit search assistance and post-submit search assistance. Presubmit search assistance is the assistance before a user submits their query, and postsubmit search assistance is the assistance provided after a user submits their query. In presubmit assistance, it is not known whether the user has finished typing his or her query, and the input, by default, is considered as a portion of a search query (also referred to herein as a prefix). On the other hand, in postsubmit assistance, the full query is known. Therefore, in general, for the same user input, the suggestions in presubmit and postsubmit can be very different. For example, consider the prefix "awk", where the top presubmit suggestions can be "awkward", "awkward family photos" and "awk example". Once "awk" is submitted as a query, however, the search engine is likely to recognize the query as the "awk" programming language, and provide postsubmit suggestions such as "awk example", "awk tutorial", "sed", etc.

Many, if not all, of the known query generation, query expansion and query reformulation techniques define the problem in the context that the input search query is given. Therefore, these techniques are only useful for postsubmit assistance.

A typical approach in commercial search engines for presubmit assistance is to complete a user's prefix to save the user from typing the query in manually, and also to help the user phrase their query when they start typing but do not exactly know which query terms to use or how to spell them. The widely accepted solution for the presubmit is to suggest the most frequent queries that match the user's portion of the search query. For example, suppose a user types, as a portion of a search query, the word "chinese" into a search query entry area, the top suggestions are typically "chinese new year", "chinese dictionary", "chinese translation", and "chinese zodiac", which are, in this example, the queries with the highest marginal frequency that match the portion of the search query.

SUMMARY

An underlying assumption with respect to suggesting the most frequent queries that match the user's portion of the search query is that the intent of the user is not defined. Hence, except the changes in the query frequencies that may change the ordering in time, presubmit query suggestions for a given prefix remain unchanged and the user will always see the same set of query suggestions for the same prefix.

In this disclosure, user's intent can be inferred from the queries the user recently issued, and the suggestions can be contextualized using this information. In one aspect, a computing device stores a global set of search suggestions. The computing device receives over a network from a user computer operated by a user one or more alphanumeric characters forming a portion of a search query. The computing device determines a search suggestion to the portion of the search query from the global set of search suggestions based on a search history of the user, the search history of the user comprising a plurality of search queries entered by the user within a predetermined period of time. The computing device transmits to the user computer the search suggestion for display by the user computer.

In one embodiment, the computing device converts the plurality of search queries into a set of units. The computing device can determine a set of query pairs from the set of units. In one embodiment, the computing device determines search suggestions from the search queries, and in one embodiment re-ranks the search suggestions based on the user's previously submitted queries.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
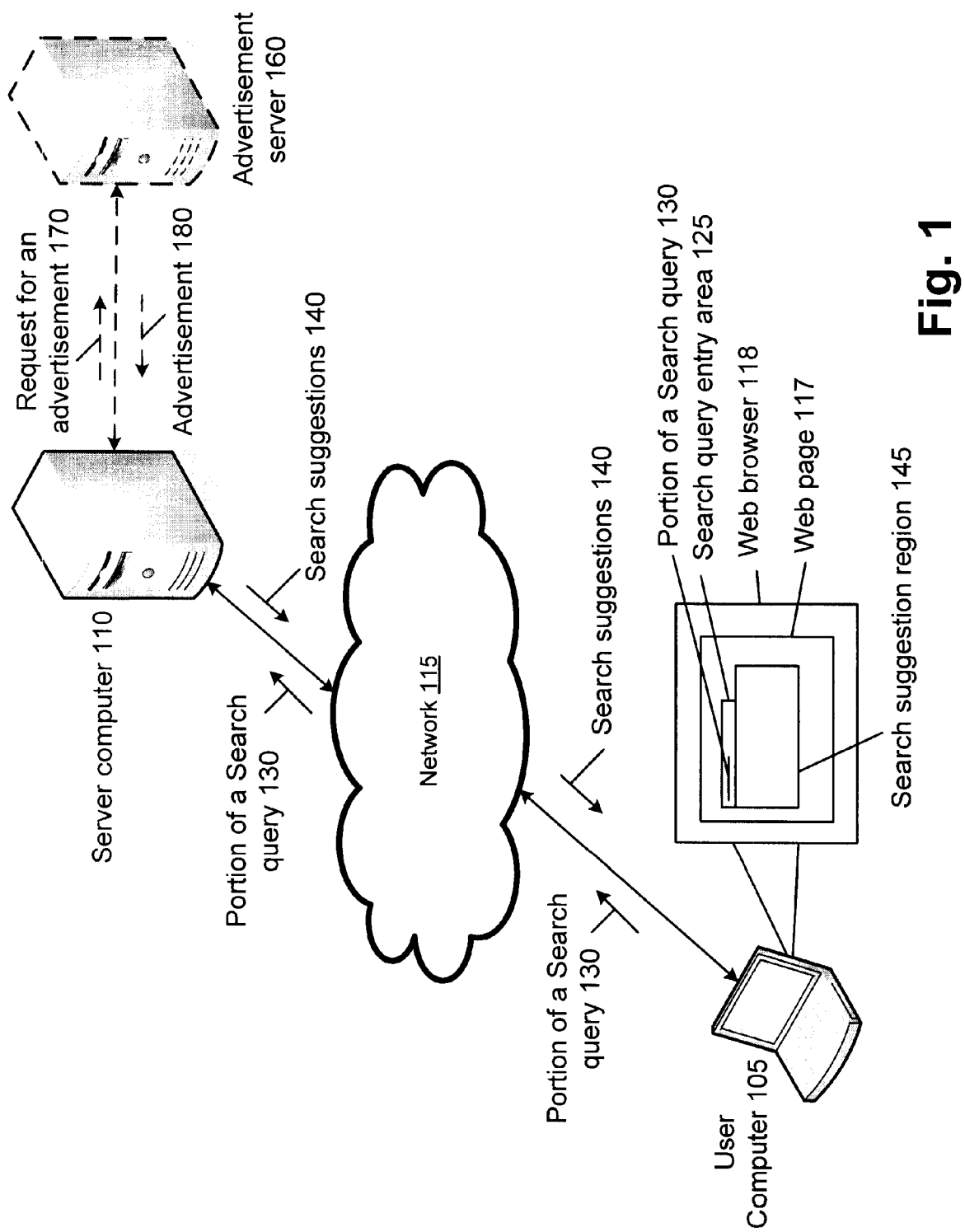
FIG. 1 is a block diagram of a user computer communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

FIG. 1 is a block diagram of an embodiment of a user computer 105 communicating with a server computer 110 over a network 115 such as the Internet. In one embodiment, a user uses the user computer 105 to display a web page 117 via a web browser 118. The web page 117 (e.g., Yahoo!®, Bing®, or Google®) includes a search query entry area 125 where a user can enter a portion of a search query (e.g., one or more alphanumeric characters) or a complete search query (e.g., one or more words).

In one embodiment, the user enters a portion of a search query (e.g., one or more alphanumeric characters) into the search query entry area 125. As (or, in another embodiment, after) the user types the portion of the search query into the search query entry area 125, the user computer 105 (browser 118) transmits the portion of the search query 130 to the server computer 110. In response to receiving the portion of the search query 130, the server computer 110 generates and transmits one or more search suggestions 140 to the user computer 105 for display in a search suggestion region 145. The search suggestions 140 are one or more words that relate to the portion of the search query 130 and are based on or altered by the user's recent search history.

For example, if a user enters a portion of a search query "chinese", the top search suggestions based on frequency of search queries is "chinese new year", "chinese dictionary", "chinese translation" and "chinese zodiac". In one embodiment, if the user has recently (e.g., within the last ten minutes) searched for "italian restaurant sunnyvale", the server computer 110 transmits the search suggestion "chinese restaurant sunnyvale" as the top suggestion instead of "chinese new year", "chinese dictionary", "chinese translation" or "chinese zodiac" as is typically done. As another example, suppose "ticketmaster" is one of a user's recent queries. Then if the user starts typing "ti", she sees "ticketmaster" (which is in the recent history itself) and "ticketfast" (which is related to the query "ticketmaster" in the recent history) above more generally popular suggested "tiger woods", etc., or after typing "f", "fandango", which does not typically show up in the top ten suggestions usually would show up in the top few search suggestions. In one embodiment, the portion of the search query 130 is a portion of a complete word or phrase (e.g., a few letters of a word). Although described as a portion of a search query 130, the user can instead enter a complete search query (e.g., a complete word or phrase) with the same results.

In one embodiment, the search suggestion region 145 is an area of a web page that is different than the area containing search results of a search. In one embodiment, the search suggestion region 145 overlaps, is positioned above, is positioned below, or is positioned next to the area containing search results. The area containing search results is typically an area containing search results for a search query or a portion of a search query that contains links to web sites and a brief textual description associated with each web site. In another embodiment, the search suggestion region 145 is the same as the area containing search results. For example, Google Instant® is a service that returns, in a search results area, search results for a complete search query or a portion of a search query. These search results are located below the search query entry area and are links associated with web pages potentially related to the search query or portion of the search query. Further, the search suggestion region 145 can be opened or closed by the user or automatically. Additionally, any number of search suggestions can be displayed in the search suggestion region 145.

In one embodiment, the server computer 110 is in communication with an advertisement server 160 (shown in dashed lines). The advertisement server 160 may be a module or component within the server computer 110 or an external module or component. In one embodiment, the server computer 110 transmits a request for an advertisement 170 to the advertisement server 160. In one embodiment, the request 170 is for an advertisement related to one or more of the search suggestions 140. The advertisement server 160 transmits an advertisement 180 to the server computer 110, and the server computer 110 transmits the advertisement 180 as part of the search suggestions 140 displayed on the user computer 105. In another embodiment, one or more of the search suggestions 140 transmitted to the user computer 105 are search suggestions 140 sponsored by a third party. For example, a third party may pay the owner of the server computer 110 to display their search suggestion 140 at a particular position (e.g., second) in the list of search suggestions 140.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

Figure 2:
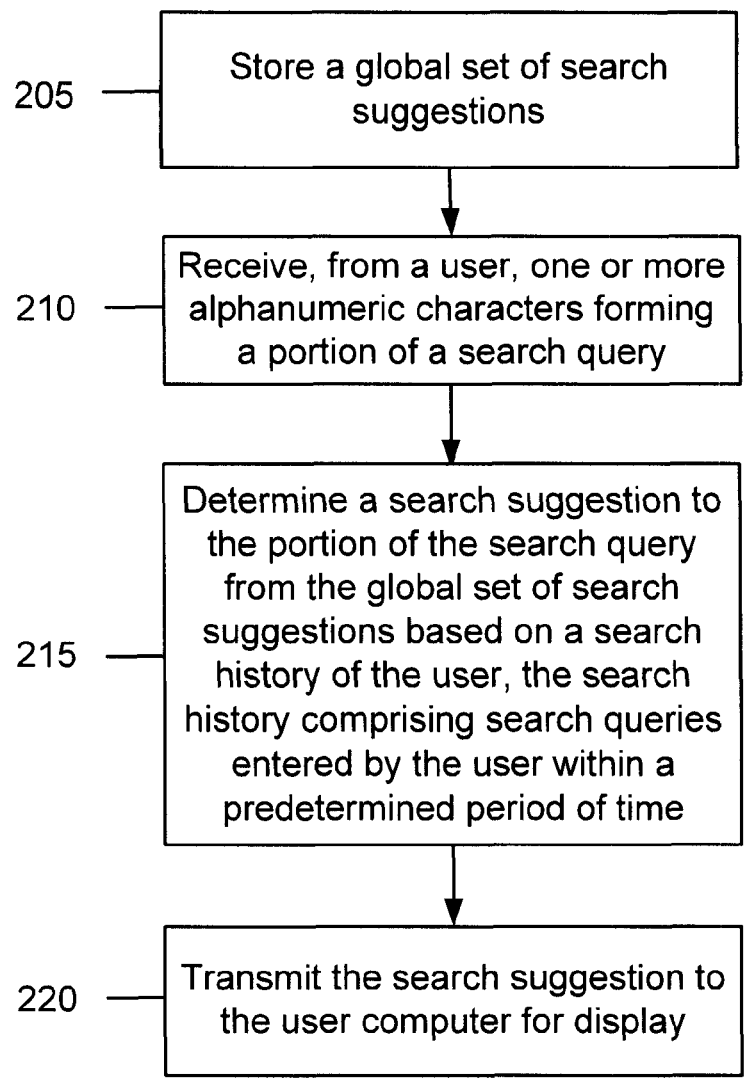
FIG. 2 is a flowchart illustrating steps performed by the server computer of FIG. 1 in accordance with an embodiment of the present disclosure.

FIG. 2 shows a flowchart illustrating an embodiment of the steps performed by the server computer 110. The server computer 110 stores a global set of search suggestions (e.g., in a database, on a hard drive, etc.) (step 205). The server computer 110 receives, from the user computer, one or more alphanumeric characters forming a portion of a search query 130 (step 210). The server computer 110 then determines one or more search suggestions 140 that are related to the portion of the search query 130 from the global set of search suggestions based on or altered by a search history of the user, the search history comprising search queries entered by the user and within a predetermined period of time (e.g., within the past ten minutes, within the past two days, etc.) (step 215). For example, if a user has searched for sports-related subject matter within a predetermined time period (e.g., within the last two days), and the portion of the search query 130 is "ko", the server computer 110 determines, in one embodiment, that the search suggestions 140 should relate to "Kobe Bryant" and not "kobe beef". Alternatively, if the user has searched for restaurants within a predetermined time period (e.g., within the last two days), and the portion of the search query 130 is "ko", the server computer 110 determines, in one embodiment, that the search suggestions 140 should relate to "kobe beef". This personalization can occur over any period of time, can occur for one or more users, and can be an option that the user activates. The server computer 110 then transmits the search suggestion(s) 140 to the user computer for display (step 220).

In one embodiment, the user's intent is inferred from the queries that they recently submitted. In one embodiment, pairs of query terms that tend to co-occur in the same session (i.e., within a predetermined period of time) are identified. The user's intent is then inferred and the query suggestions are contextualized by re-ranking the in-context queries higher. Search assist powered by session analysis is described in U.S. patent application Ser. No. 12/882,974, the disclosure of which is incorporated by reference herein.

Except for navigational queries, most user information needs require more than a single query and while searching for information users usually issue related queries within short time frames. In one embodiment, queries issued in the same session are used as a reliable source of information for query generation and search assistance.

Query Reformulation Log-Likelihood Ratio

Let $(q_1, q_2)$ represent a query pair (which is referred to below as units $(u_1, u_2)$). Co-occurrence can be defined as a query pair issued by the same user within a short time frame (e.g., ten minutes), and $q_2$ comes later in time. The pointwise mutual information of $q_1$ and $q_2$ is defined as $$PMI(q_1, q_2) = \log\left(\frac{p(q_1, q_2)}{p(q_1, *)p(*, q_2)}\right) \quad (1)$$

which measures the dependence of these two queries as the ratio between the probability of their co-occurrence given by the joint distribution versus the probability of their co-occurrence by coincidence, assuming independence. Here, $p(q_1, q_2)$ denotes the probability of co-occurrence, that is the query pair is issued by the same user within a short time window. Similarly, $p(q_1, *)$ denotes the probability that the first query $q_1$ is reformulated to any query, and $p(*, q_2)$ denotes the probability that any query is reformulated into $q_2$. These probabilities can directly be estimated from query logs as follows:

$$p(q_1, q_2) = \frac{N_{12}}{N_{**}}, \; p(q_1, *) = \frac{N_{1*}}{N_{**}}, \; p(*, q_2) = \frac{N_{*2}}{N_{**}} \quad (2)$$

where $N_{12}$: frequency that $q_1$ co-occurs with $q_2$,
$N_{1*}$: frequency that $q_1$ co-occurs with any query,
$N_{*2}$: frequency that any query co-occurs with $q_2$, and
$N_{**}$: frequency that any query co-occurs with any query.

One potential problem is that, if either $q_1$ or $q_2$ (or both) are tail queries, even a single co-occurrence can yield a high PMI value. One solution to this is to use log-likelihood ratio (LLR) instead of PMI, which is given as follows:

$$LLR(q_1, q_2) = p(q_1, q_2)PMI(q_1, q_2) + p(q_1, \overline{q_2})PMI(q_1, \overline{q_2}) + \quad (3)$$
$$p(\overline{q_1}, q_2)PMI(\overline{q_1}, q_2) + p(\overline{q_1}, \overline{q_2})PMI(\overline{q_1}, \overline{q_2})$$

where $\overline{q_1}$ denotes all queries except $q_1$, and same for $\overline{q_2}$. Similarly, these probabilities can be evaluated using the above frequency counts.

$$p(\overline{q_1}, q_2) = (N_{*2} - N_{12})/N_{**} \quad (4)$$
$$p(q_1, \overline{q_2}) = (N_{1*} - N_{12})/N_{**}$$
$$p(\overline{q_1}, \overline{q_2}) = (N_{} - N_{12})/N_{}$$

Note that LLR can be regarded as the expected value of PMI, and in the expectation the total number of reformulations has also been taken into account. In one embodiment, if either $q_1$ and $q_2$ or both of them are tail queries, the first term in the LLR formula looses importance (since $p(q_1, q_2)$ will be much lower than $p(\overline{q_1}, q_2)$ or $p(q_1, \overline{q_2})$), yielding a more stable measure of dependency as the number of observations get smaller.

Unit Reformulation Log-Likelihood Ratio

In one embodiment, a goal is to identify pairs of units that tend to co-occur in query reformulations. While reformulating their queries, users sometimes add a term or drop one of the terms in the original query, sometimes they do lateral moves (such as "visa" to "mastercard") or partially lateral moves (such as "burton snowboard reviews" to "ride snowboard reviews"). Without constraining on any of these reformulation types, to identify pairs of units that are likely to co-occur in the same session, in one embodiment the above LLR formulation are calculated over pairs of units from each query; hence, the first step is to segment queries into units. In one embodiment, a statistical taggers and named-entity taggers model is used. Systems and methods for generating concept units from search queries is described in U.S. Pat. No. 7,051,023, the disclosure of which is incorporated by reference herein.

For the query pair $(q_1, q_2)$ (where, as stated above, $q_2$ comes later in time), let the segmentations of the queries be $q_1 = u_1^1, u_1^2, \ldots, u_1^K$. and $q_2 = u_2^1, u_2^2, \ldots, u_2^L$. Using the segmentation, for pairs of units $u_1^i \in q_1$ and $u_2^j \in q_2$, one can define the unit reformulation log-likelihood ratio LLR $(u_1, u_2)$, namely the likelihood that the unit $u_1$ from the first query, and the unit $u_2$ from the second query will co-occur.

$$LLR(u_1, u_2) = p(u_1, u_2)PMI(u_1, u_2) + p(u_1, \overline{u_2})PMI(u_1, \overline{u_2}) + \quad (5)$$
$$p(\overline{u_1}, u_2)PMI(\overline{u_1}, u_2) + p(\overline{u_1}, \overline{u_2})PMI(\overline{u_1}, \overline{u_2})$$

Again, one can write all required terms directly in terms of frequency counts over the session log data as follows:

$$p(u_1, u_2) = K_{12}/K_{**}$$
$$p(u_1, *) = K_1^*/K_{**}$$
$$p(*, u_2) = K^*_2/K_{**}$$
$$p(\overline{u_1}, u_2) = (K^*_2 - K_{12})/K_{**}$$
$$p(u_1, \overline{u_2}) = (K^*_1 - K_{12})/K_{**}$$
$$p(\overline{u_1}, \overline{u_2}) = (K_{} - K_{12})/K_{}$$
$$p(\overline{u_1}, *) = (K_{**} - K_1^*)/K_{**}$$
$$p(*, \overline{u_2}) = (K_{**} - K^*_2)/K_{**} \quad (6)$$

where:

$K_{12}$: frequency that $u_1 \in q_1$ co-occurs with a query $q_2$ that contains the unit $u_2$
$K_1^*$: frequency that $u_1 \in q_1$ co-occurs with any unit in any query $K^*_2$: frequency that any unit in any query co-occurs with $u_2 \in q_2$ $K^{**}$: frequency that any unit in any query co-occurs with any unit in any query In one embodiment, a unit reformulation likelihood dictionary is built from the unit pairs that satisfy $LLR(u_1, u_2) > \kappa$ and, in one embodiment, empirically set the threshold to $\kappa = 40$. Furthermore, to filter out the pairs that include units that are not entities or real-world concepts, the stand-alone score is used, which in one embodiment is given as follows:

$$s(u) = \frac{f(u = q)}{f(u \subseteq q)} \qquad (7)$$

where $f(u=q)$ is the frequency that this unit observed as a stand-alone query in the query logs, and $f(u \subset q)$ is the frequency of the queries that contain this unit. In one embodiment, if a unit is a real-world concept (e.g., Bank of America, San Francisco, Canon 50d, Roger Waters, or photography), it should be observed in the query logs in stand-alone form. When mining the query logs to build this database, queries that triggered the search engine's spelling correction module are eliminated. The intuition behind this is to avoid most frequently occurring misspellings which may show high correlation with the corrected query. In one embodiment, the pairs that include units with $s(u) < \gamma$ are filtered out, and in one embodiment empirically set $\gamma = 0.02$.

Examples from Unit Reformulation Dictionary

Examples from the unit reformulation likelihood dictionary are as follows:

most single unit navigational queries are not in the dictionary very frequent navigational queries are not there ("facebook"→"facebook" is not there)

stop words

"itailan"→"italian", "chinese", "italy"

Ranking Model

In one embodiment, as users are typing their query, in one embodiment the server computer 110 offers suggestions for completing the query based on two components. First, the server computer 110 accounts for the prior probability of a suggestion being useful. Typically, this is derived using the absolute frequency of a suggestion based on past user queries in the search engine logs. In one embodiment, the normalization factor does not affect the relative ranking of suggestions and is therefore not used. This factor can be referred to as $G(s)$ for a suggestion s.

Second, the server computer 110 takes into account a user's short-term history (e.g., current session) and computes a contextualization score denoted as $C(s)$ for a suggestion s. Given a suggestion s, $C(s)$ is computed using the LLR values of pairs of units in a user's history and those in s. In one embodiment, the dictionary is built off-line while this scoring occurs during runtime after referencing the dictionary. Formally, $C(s)$ is computed as follows:

$$C(s) = \sum_{u_q \in U_s} u_q \in U_s \sum_{u_h \in U_h} LLR(u_q, u_h) \cdot e^{-t-t(u_h)} \qquad (8)$$

where $U_s$ is the set of units in s, $U_h$ is the set of units from past queries in the session, t is the current time and $t(u_h)$ is the time at which query that contains unit $u_h$ was issued. With respect to the factor $e^{-t-t(u_h)}$, as a query session progresses, in one embodiment the importance of units from the queries that were issued at the beginning of the session is demoted and more importance is given to those from recent (e.g., previous or previous to previous) queries. Further, if a unit is repeated multiple times in a session such as the unit 'restaurant' in 'italian dining restaurant', 'chinese restaurant', and 'family style restaurant', each occurrence of this unit is traced and associated with one timestamp per occurrence. Therefore, at runtime, the server computer 110 can maintain a data structure of units and a list of timestamps associated with each unit.

Several blending functions can be defined to compute a final score $S(s)$. The extent to which contextualization can be applied can be varied depending on a confidence in the contextualization information available. For example, as a query session progresses with homogeneity, the confidence in the session topic increases and thus the contextualization factor can gradually dominate the blending function. With this in mind, in one embodiment a parameter is used that controls the amount of contextualization to contribute to the final score of a suggestion ($0 \geq \alpha \leq 1$).

The proposed framework is generic enough to be used for long-term query suggestion personalization. In particular, instead of discarding units in a user's history, user profiles can be created based on these units. Keeping track of units observed in the past can prove inefficient and they can be generalized to topics. For instance, if units such as "Kobe Bryant", "Kevin Garnett", "Tracy McGrady" are observed, the general topic of "American Basketball" may be saved. It is noteworthy that the proposed ranking methods can be used to score suggestions based on such topic-based user profiles.

Product Blending Function

One approach to a blending function is to take a product of the two scores.

$$S(s) = G(s)^\alpha * C(s)^{(1-\alpha)} \qquad (9)$$

Bi-Model Blending Function:

The final score can also be defined as a mixture of the individual scores.

$$S(s) = \alpha \cdot G(s) + C(s)^{(1-\alpha)} \qquad (10)$$

Calibrated Bi-Modal Blending Function:

The above blending functions assumed that the values for $G(s)$ and $C(s)$ belong to the same domains and thus do not need to be calibrated. However, values for these functions are unbounded, non-probabilistic values. Thus, a blending function can calibrate scores from these two sources:

$$S(s) = \alpha \cdot \frac{G(s)}{\beta_g + G(s)} + (1-\alpha) \cdot \frac{C(s)}{\beta_c + C(s)} \qquad (11)$$

The parameter $\beta_x$ controls the sensitivity to absolute values for $G(s)$ and $C(s)$ ($1 \geq \beta \leq \infty$). In one embodiment, lower values of $\beta_x$ allows more sensitivity to $G(s)$ or $C(s)$ and similarly lower values for $\alpha$ lowers the influence of contextualization.

The value of $\alpha$ can be a static value which maximizes the perceived contextualization as well as the relevance of suggestions over a held-out training set. In another embodiment, the value $\alpha$ can dynamically change depending on the confidence in the user's session topic. In one embodiment, the server computer 110 calculates a value for $\alpha$ based on the entropy of the set of queries issued by the user so far. In one embodiment, $\alpha$ is:

$$\alpha = sigmoid \sum_{u \in q_1} \sum_{u_h \in U_h} LLR(u_h, u) \quad (12)$$

where $q_1$ is the last query issued by the user. In other embodiments, a session boundary can be identified.

Co-occurrence of the same unit or related units (such as 'canon' and 'nikon') is only one way of measuring query similarity, and there might be many alternative solutions. For example, an alternative embodiment might be mapping all queries into a topic space, and measuring the similarity over this space, such that the queries that belong to the same topic(s) get high similarity scores and the other way around. Topic mapping can be achieved in a number of ways, perhaps the most well-known method for this is clustering the queries and defining the topic distribution of each query. Here instead of using the most likely topic, a distribution over the topics (for example the most likely 5 topics etc.) should be preferred to avoid the imperfections in the clustering affecting the similarity calculations, and more importantly to handle queries that have multiple intents. The topic distributions can simply be represented by an ID number, and being close or far in the numbers doesn't necessarily mean anything (for example topic #35 and #36 might be completely unrelated topics). Consider the following example:

jaguar #853 #239 #1001 #1575 #1424
panther #239 #1424 #254 #2418 #1236
cadillac #853 #1159 #1068 #1575 #369
porsche #853 #1068 #1575 #369 #1159
windows vista #1001 #343 #54 #1925 #35 where queries are mapped to 5 most likely topics, each ID number representing a topic. Clearly the query 'jaguar' has at least one intersecting topic (hence, non-zero similarity) with all the other queries due to its multiple meanings; jaguar the animal, jaguar the car, and mac os x jaguar the operating system. As for the individual topic ID's, since #853 and #1575 have something to do with cars or may be more specifically with luxury cars as 'jaguar', 'porsche' and 'cadillac' queries have this topic. Similarly #1001 seems to be a operating system related topic as it is common between 'jaguar' and 'windows vista' and so on. Note that as long as the related queries have some non-zero overlap, what each individual topic is not even important for defining the query to query similarity.

Clustering queries is only an example for defining the topic distribution. Another alternative might be to look at the top results (without loss of generality, say top 10) and analyze the content of the results by counting the frequently occurring context terms in the results, and the topic of the query can be represented by the frequently occurring terms in the results of that query. After defining the query-to-topic mapping by clustering, result set analysis, or some other method, measuring the query similarity over the topic space can be achieved by well-known cosine similarity or Jaccard similarity.

In summary, the co-occurrence of same or related units is only one way of defining query similarity. Although unit co-occurrence based approach has advantage of being very low computational complexity as opposed to the topic mapping based methods described above, if the topics that the queries belong to is pre-computed and stored along with the queries, the topic mapping based methods can also be implemented very efficiently.

Various monetization techniques or models may be used in connection with sponsored search advertising, including advertising associated with user search queries, and non-sponsored search advertising, including graphical or display advertising. In an auction-based online advertising marketplace, advertisers may bid in connection with placement of advertisements, although many other factors may also be included in determining advertisement selection or ranking. Bids may be associated with amounts the advertisers pay for certain specified occurrences, such as for placed or clicked-on advertisements, for example. Advertiser payment for online advertising may be divided between parties including one or more publishers or publisher networks, and one or more marketplace facilitators or providers, potentially among other parties.

Some models include guaranteed delivery advertising, in which advertisers may pay based on an agreement guaranteeing or providing some measure of assurance that the advertiser will receive a certain agreed upon amount of suitable advertising, and non-guaranteed delivery advertising, which may be individual serving opportunity-based or spot market-based. In various models, advertisers may pay based on any of various metrics associated with advertisement delivery or performance, or associated with measurement or approximation of a particular advertiser goal. For example, models can include, among other things, payment based on cost per impression or number of impressions, cost per click or number of clicks, cost per action for some specified action, cost per conversion or purchase, or cost based on some combination of metrics, which can include online or offline metrics.

Figure 3:
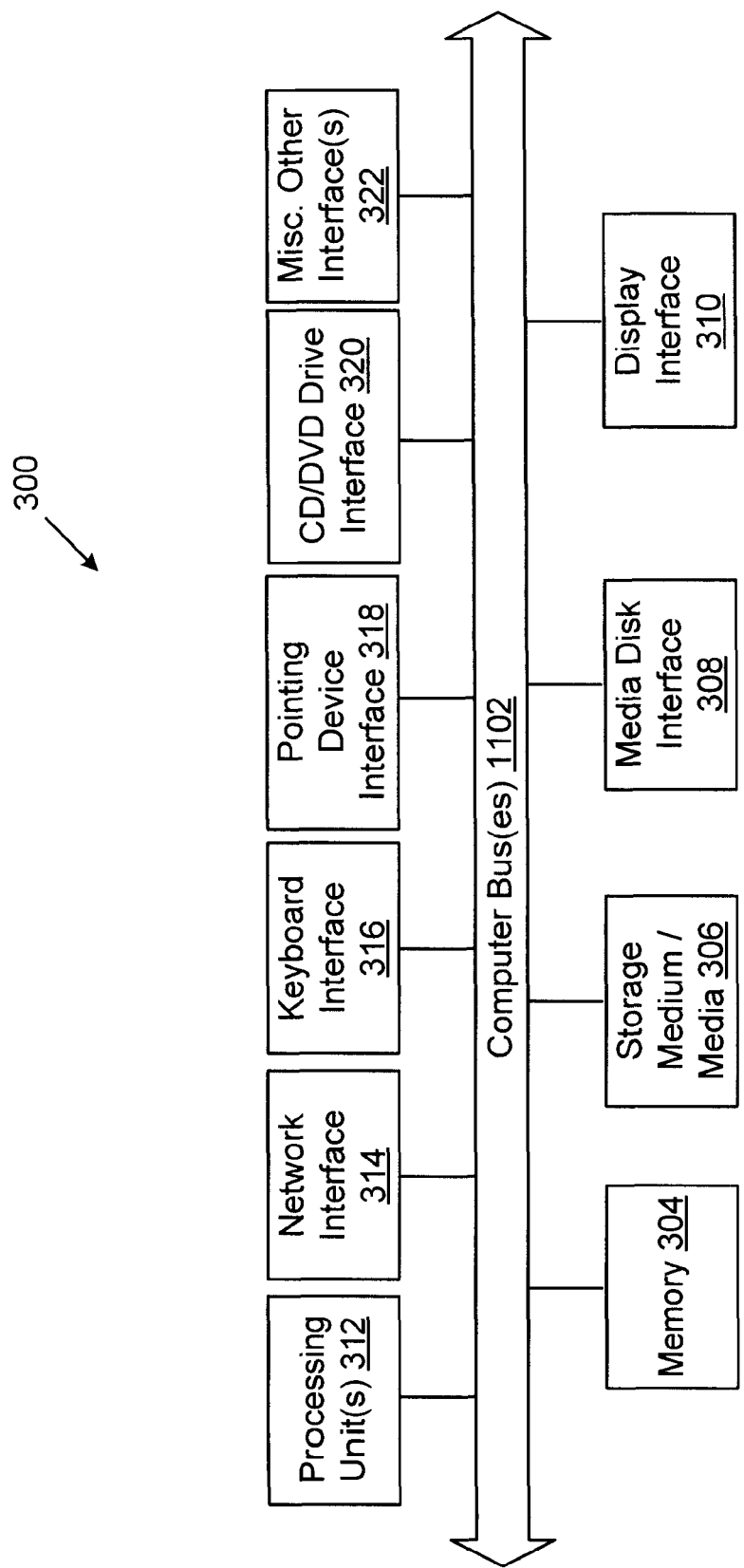
FIG. 3 is a block diagram illustrating an internal architecture of a computing device in accordance with an embodiment of the present disclosure.

FIG. 3 is a block diagram illustrating an internal architecture of an example of a computing device, such as server computer 110 and/or user computer 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 3, internal architecture 300 includes one or more processing units (also referred to herein as CPUs) 312, which interface with at least one computer bus 302. Also interfacing with computer bus 302 are persistent storage medium/media 306, network interface 314, memory 304, e.g., random access memory (RAM), run-time transient memory, read only memory (ROM), etc., media disk drive interface 308 as an interface for a drive that can read and/or write to media including removable media such as floppy, CD-ROM, DVD, etc. media, display interface 310 as interface for a monitor or other display device, keyboard interface 316 as interface for a keyboard, pointing device interface 318 as an interface for a mouse or other pointing device, and miscellaneous other interfaces not shown individually, such as parallel and serial port interfaces, a universal serial bus (USB) interface, and the like.

Memory 304 interfaces with computer bus 302 so as to provide information stored in memory 304 to CPU 312 during execution of software programs such as an operating system, application programs, device drivers, and software modules that comprise program code, and/or computer-executable process steps, incorporating functionality described herein, e.g., one or more of process flows described herein. CPU 312 first loads computer-executable process steps from storage, e.g., memory 304, storage medium/media 306, removable media drive, and/or other storage device. CPU 312 can then execute the stored process steps in order to execute the loaded computer-executable process steps. Stored data, e.g., data stored by a storage device, can be accessed by CPU 312 during the execution of computer-executable process steps.

Persistent storage medium/media 306 is a computer readable storage medium(s) that can be used to store software and data, e.g., an operating system and one or more application programs. Persistent storage medium/media 306 can also be used to store device drivers, such as one or more of a digital camera driver, monitor driver, printer driver, scanner driver, or other device drivers, web pages, content files, playlists and other files. Persistent storage medium/media 306 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   storing, by a server computer, a global set of search suggestions;
   receiving, by the server computer over a network from a user computer operated by a user, one or more alphanumeric characters forming a portion of a search query;
   determining, by the server computer, a search suggestion to the portion of the search query from the global set of search suggestions based on a search history of the user operating the user computer, the search history of the user comprising a plurality of search queries entered by the user within a predetermined past period of time;
   converting, by the server computer, the plurality of search queries into a set of units;
   determining, by the server computer, a set of query pairs $q_1$ and $q_2$ from the set of units; and
   transmitting, by the server computer to the user computer, the search suggestion for display by the user computer.

2. The method of claim 1 wherein the determining of a search suggestion further comprises computing a pointwise mutual information of the query pairs, the pointwise mutual information of $q_1$ and $q_2$ is defined as:

$$PMI(q_1, q_2) = \log\left(\frac{p(q_1, q_2)}{p(q_1, *)p(*, q_2)}\right)$$

where $p(q_1, q_2)$ denotes the probability of co-occurrence, that is the query pair is issued by the same user within a short time window, $p(q_1, *)$ denotes the probability that the first query $q_1$ is reformulated to any query, and $p(*, q_2)$ denotes the probability that any query is reformulated into $q_2$.

3. The method of claim 2 wherein the probabilities can directly be estimated from query logs as follows:

$$p(q_1, q_2) = \frac{N_{12}}{N_{**}}, \ p(q_1, *) = \frac{N_{1*}}{N_{**}}, \ p(*, q_2) = \frac{N_{*2}}{N_{**}}$$

where
   $N_{12}$: frequency that $q_1$ co-occurs with $q_2$,
   $N_{1*}$: frequency that $q_1$ co-occurs with any query,
   $N_{*2}$: frequency that any query co-occurs with $q_2$, and
   $N_{**}$: frequency that any query co-occurs with any query.

4. The method of claim 3 wherein the determining of a search suggestion further comprises computing, by the server computer, a Log Likelihood Ratio (LLR) value for the set of query pairs, where the LLR is given as:

$$LLR(q_1, q_2) = p(q_1, q_2)PMI(q_1, q_2) + p(q_1, \overline{q_2})PMI(q_1, \overline{q_2}) + p(\overline{q_1}, q_2)PMI(\overline{q_1}, q_2) + p(\overline{q_1}, \overline{q_2})PMI(\overline{q_1}, \overline{q_2})$$

where $\overline{q_1}$ denotes all queries except $q_1$, and same for $\overline{q_2}$.

5. The method of claim 4, wherein the probabilities are evaluated using the above frequency counts using the formulas:

$$p(\overline{q_1}, q_2) = (N_{*2} - N_{12})/N_{**}$$

$$p(q_1, \overline{q_2}) = (N_{1*} - N_{12})/N_{**}$$

$$p(\overline{q_1}, \overline{q_2}) = (N_{} - N_{12})/N_{}$$

6. The method of claim 5 wherein, for the query pair $(q_1, q_2)$, let the segmentations of the queries be $q_1 = u_1^1, u_1^2, \ldots, u_1^K$ and $q_2 = u_2^1, u_2^2, \ldots u_2^L$, and using the segmentation, for pairs of units $u_1^i \in q_1$ and $u_2^j \in q_2$, the unit reformulation log-likelihood ratio LLR $(u_1, u_2)$, is defined as:

$$LLR(u_1, u_2) = p(u_1, u_2)PMI(u_1, u_2) + p(u_1, \overline{u_2})PMI(u_1, \overline{u_2}) +$$
$$p(\overline{u_1}, u_2)PMI(\overline{u_1}, u_2) + p(\overline{u_1}, \overline{u_2})PMI(\overline{u_1}, \overline{u_2})$$

and required terms are written directly in terms of frequency counts over the session log data as follows:

$$p(u_1, u_2) = K_{12}/K^{**}$$

$$p(u_1, *) = K_1^*/K^{**}$$

$$p(*, u_2) = K^*_2/K^{**}$$

$$p(\overline{u_1}, u_2) = (K^*_2 - K_{12})/K^{**}$$

$$p(u_1, \overline{u_2}) = (K_1^* - K_{12})/K^{**}$$

$$p(\overline{u_1}, \overline{u_2}) = (K^{} - K_{12})/K^{}$$

$$p(\overline{u_1}, *) = (K^{**} - K_1^*)/K^{**}$$

$$p(*, \overline{u_2}) = K^{**} - K^*_2)K^{**}$$

where:
- $K_{12}$: frequency that $u_1 \in q_1$ co-occurs with a query $q_2$ that contains the unit $u_2$
- $K_1^*$: frequency that $u_1 \in q_1$ co-occurs with any unit in any query
- $K^*_2$: frequency that any unit in any query co-occurs with $u_2 \in q_2$
- $K^{**}$: frequency that any unit in any query co-occurs with any unit in any query.

7. The method of claim 6 wherein a unit reformulation likelihood dictionary is built from the unit pairs that satisfy $LLR(u_1, u_2) > \kappa$, where $\kappa$ is a predetermined threshold.

8. The method of claim 7, wherein, to filter out the pairs that include units that are not entities or real-world concepts, a stand-alone score is used, which is given as follows:

$$s(u) = \frac{f(u = q)}{f(u \subseteq q)}$$

where $f(u=q)$ is the frequency that this unit observed as a stand-alone query in the query logs, and $f(u \subset q)$ is the frequency of the queries that contain this unit.

9. The method of claim 8, further comprising taking into account a user's short-term history and computing a contextualization score denoted as $C(s)$ for a suggestion s, where given a suggestion s, $C(s)$ is computed using the LLR values of pairs of units in a user's history and those in s, $C(s)$ being computed as follows:

$$C(s) = \sum u_q \in U_s \sum_{u_h \in U_h} LLR(u_q, u_h) \cdot e^{-t-t(u_h)}$$

where $U_s$ is the set of units in s, $U_h$ is the set of units from past queries in the session, t is the current time and $t(u_h)$ is the time at which query that contains unit $u_h$ was issued.

10. The method of claim 9, wherein a blending function is calculated, the blending function calibrating scores from two sources and computed as follows:

$$S(s) = \alpha \cdot \frac{G(s)}{\beta_g + G(s)} + (1 - \alpha) \cdot \frac{C(s)}{\beta_c + C(s)}$$

where parameter $\beta_x$ controls the sensitivity to absolute values for $G(s)$ and $C(s)$ and a value of $\alpha$ can given as:

$$\alpha = sigmoid \sum_{u \in q_1} \sum_{u_h \in U_h} LLR(u_h, u)$$

where $q_1$ is the last query issued by the user.

11. The method of claim 1 further comprising updating the search suggestion as additional alphanumeric characters are received.

12. A computing device comprising:
   a processor;
   a storage medium for tangibly storing thereon program logic for execution by the processor, the program logic comprising:
      logic executed by the processor for storing a global set of search suggestions;
      logic executed by the processor for receiving, over a network from a user computer operated by a user, one or more alphanumeric characters forming a portion of a search query;
      logic executed by the processor for determining a search suggestion to the portion of the search query from the global set of search suggestions based on a search history of the user operating the user computer, the search history of the user comprising a plurality of search queries entered by the user within a predetermined past period of time;
      logic executed by the processor for converting the plurality of search queries into a set of units;
      logic executed by the processor for determining a set of query pairs $q_1$ and $q_2$ from the set of units; and
      logic executed by the processor for transmitting, to the user computer, the search suggestion for display by the user computer.

13. The computing device of claim 12 wherein the logic for determining a search suggestion further comprises logic executed by the processor for computing a pointwise mutual information of the query pairs, the pointwise mutual information of $q_1$ and $q_2$ is defined as:

$$PMI(q_1, q_2) = \log\left(\frac{p(q_1, q_2)}{p(q_1, *)p(*, q_2)}\right)$$

where $p(q_1, q_2)$ denotes the probability of co-occurrence, that is the query pair is issued by the same user within a short time window, $p(q_1, *)$ denotes the probability that the first query $q_1$ is reformulated to any query, and $p(*, q_2)$ denotes the probability that any query is reformulated into $q_2$.

14. The computing device of claim 13 wherein the probabilities can directly be estimated from query logs as follows:

$$p(q_1, q_2) = \frac{N_{12}}{N_{**}}, \; p(q_1, *) = \frac{N_{1*}}{N_{**}}, \; p(*, q_2) = \frac{N_{*2}}{N_{**}}$$

where
 $N_{12}$: frequency that $q_1$ co-occurs with $q_2$,
 $N_{1*}$: frequency that $q_1$ co-occurs with any query,
 $N_{*2}$: frequency that any query co-occurs with $q_2$, and
 $N_{**}$: frequency that any query co-occurs with any query.

15. The computing device of claim 14 wherein the determining of a search suggestion further comprises computing a Log Likelihood Ratio (LLR) value for the set of query pairs, where the LLR is given as:

$$LLR(q_1, q_2) = p(q_1, q_2)PMI(q_1, q_2) + p(q_1, \overline{q_2})PMI(q_1, \overline{q_2}) + p(\overline{q_1}, q_2)PMI(\overline{q_1}, q_2) + p(\overline{q_1}, \overline{q_2})PMI(\overline{q_1}, \overline{q_2})$$

where $\overline{q_1}$ denotes all queries except $q_1$, and same for $\overline{q_2}$.

16. The computing device of claim 15 wherein, for the query pair $(q^1, q_2)$, let the segmentations of the queries be $q_1 = u_1^1, u_1^2, \ldots, u_1^K$ and $q_2 = u_2^1, u_2^2, \ldots, u_2^L$, and using the segmentation, for pairs of units $u_1^i \in q_1$ and $u_2^j \in q_2$, the unit reformulation log-likelihood ratio $LLR(u_1, u_2)$ can be defined as:

$$LLR(u_1, u_2) = p(u_1, u_2)PMI(u_1, u_2) + p(u_1, \overline{u_2})PMI(u_1, \overline{u_2}) + p(\overline{u_1}, u_2)PMI(\overline{u_1}, u_2) + p(\overline{u_1}, \overline{u_2})PMI(\overline{u_1}, \overline{u_2})$$

and required terms are written directly in terms of frequency counts over the session log data as follows:

$p(u_1, u_2) = K_{12}/K^{**}$ $p(u_1, *) = K_1^*/K^{**}$ $p(*, u_2) = K^*_2/K^{**}$ $p(\overline{u_1}, u_2) = (K^*_2 - K_{12})/K^{**}$ $p(u_1, \overline{u_2}) = (K_1^* - K_{12})/K^{}$ $p(\overline{u_1}, \overline{u_2}) = (K^{} - K_{12})/K^{**}$ $p(\overline{u_1}, *) = (K^{**} - K_1^*)/K^{**}$ $p(*, \overline{u_2}) = K^{**} - K^*_2)/K^{**}$ where:
 $K_{12}$: frequency that $u_1 \in q_1$ co-occurs with a query $q_2$ that contains the unit $u_2$
 $K_1^*$: frequency that $u_1 \in q_1$ co-occurs with any unit in any query
 $K^*_2$: frequency that any unit in any query co-occurs with $u_2 \in q_2$
 $K^{**}$: frequency that any unit in any query co-occurs with any unit in any query.

17. A non-transitory computer-readable storage medium tangibly storing thereon computer program instructions capable of being executed by a computer processor of a computing device, the computer program instructions defining the steps of:
 storing, by the computing device, a global set of search suggestions;
 receiving, by the computing device over a network from a user computer operated by a user, one or more alphanumeric characters forming a portion of a search query;
 determining, by the computing device, a search suggestion to the portion of the search query from the global set of search suggestions based on a search history of the user operating the user computer, the search history of the user comprising a plurality of search queries entered by the user within a predetermined past period of time;
 converting, by the computing device, the plurality of search queries into a set of units;
 determining, by the computing device, a set of query pairs $q_1$ and $q_2$ from the set of units; and
 transmitting, by the computing device to the user computer, the search suggestion for display by the user computer.

* * * * *